United States Patent
Han (10) Patent No.: US 10,538,183 B2
(45) Date of Patent: Jan. 21, 2020

(54) DEVICE FOR ADJUSTING HEIGHT OF CONSOLE IN VEHICLE

(71) Applicant: Seoyon E-Hwa Co., Ltd., Seoul (KR)

(72) Inventor: Hyun Pil Han, Anyang-si (KR)

(73) Assignee: Seoyon E-Hwa Co., Ltd., Seoul (KR)

( * ) Notice: Subject to any disclaimer, the term of this patent is extended or adjusted under 35 U.S.C. 154(b) by 5 days.

(21) Appl. No.: 16/045,117

(22) Filed: Jul. 25, 2018

(65) Prior Publication Data

US 2019/0047454 A1  Feb. 14, 2019

(30) Foreign Application Priority Data

Aug. 14, 2017 (KR) .................. 10-2017-0103222

(51) Int. Cl.
| | |
|---|---|
| *B60N 2/75* | (2018.01) |
| *B60R 7/04* | (2006.01) |
| *B60R 11/00* | (2006.01) |

(52) U.S. Cl.
CPC ............... *B60N 2/77* (2018.02); *B60N 2/793* (2018.02); *B60R 7/04* (2013.01); *B60R 2011/0007* (2013.01); *B60R 2011/0014* (2013.01); *B60R 2011/0084* (2013.01)

(58) Field of Classification Search
CPC .............. B60R 7/04; B60R 2011/0007; B60R 2011/0014; B60R 2011/0084; B60N 2/77; B60N 2/793
USPC .................................... 296/24.34, 37.8, 1.09
See application file for complete search history.

(56) References Cited

U.S. PATENT DOCUMENTS

| | | | | |
|---|---|---|---|---|
| 6,003,927 A * | 12/1999 | Korber | ...................... | B60R 7/04 296/37.8 |
| 6,565,137 B1 * | 5/2003 | Snook | .................... | B60N 3/002 108/147 |
| 7,168,750 B2 * | 1/2007 | Hutek | ...................... | B60R 7/04 296/37.8 |
| 7,757,888 B2 * | 7/2010 | Ogura | .................... | B60N 3/106 220/345.1 |
| 7,891,623 B2 * | 2/2011 | Haddad | .................... | B60N 3/12 224/926 |
| 8,967,695 B2 * | 3/2015 | Brinas | ...................... | B60R 7/04 296/24.34 |
| 2008/0238120 A1 * | 10/2008 | Stander | .................... | B60P 1/54 296/24.34 |
| 2010/0026026 A1 * | 2/2010 | Akahane | .................. | B60N 2/77 296/24.34 |

(Continued)

FOREIGN PATENT DOCUMENTS

| | | |
|---|---|---|
| JP | 2012056033 A | 3/2012 |
| KR | 19980008834 A | 4/1998 |

(Continued)

*Primary Examiner* — Gregory A Blankenship
(74) *Attorney, Agent, or Firm* — Harness, Dickey & Pierce, P.L.C.

(57) ABSTRACT

Provided herein is a device for adjusting a height of a console in a vehicle. The console is configured with an upper body assembly (10) having an armrest (13), and a lower body assembly (20), and a linear guide is provided between the upper body assembly (10) and the lower body assembly (20), and a motor (50) operates the linear guide, so that the upper body assembly 10 can be vertically moved. Therefore, a height of the armrest 13 can be freely adjusted according to a passenger's physical condition.

11 Claims, 10 Drawing Sheets

(56) References Cited

U.S. PATENT DOCUMENTS

| | | | | |
|---|---|---|---|---|
| 2010/0057307 A1* | 3/2010 | Copeland | ............. | B60N 2/0232 |
| | | | | 701/50 |
| 2015/0091319 A1* | 4/2015 | Mather | ..................... | B60R 7/04 |
| | | | | 296/24.34 |
| 2019/0047454 A1* | 2/2019 | Han | ......................... | B60N 2/77 |

FOREIGN PATENT DOCUMENTS

| KR | 102019990029203 U | 7/1999 |
|---|---|---|
| KR | 20030024982 A | 3/2003 |
| KR | 20060006458 A | 1/2006 |
| KR | 100748752 B1 | 8/2007 |

* cited by examiner

DEVICE FOR ADJUSTING HEIGHT OF CONSOLE IN VEHICLE

CROSS-REFERENCE TO RELATED APPLICATIONS

This application claims priority to Korean Patent Application No. 10-2017-0103222, filed on Aug. 14, 2017, the disclosure of which is incorporated herein by reference in its entirety.

BACKGROUND OF THE INVENTION

Field of the Invention

Exemplary embodiments of the present invention relate to a device for adjusting a height of a console in a vehicle, which adjusts a height of a center console installed between a driver seat and a front passenger seat to allow a passenger to set the height according to his or her physical condition, so that a passenger's arm can be more comfortably supported.

Description of the Related Art

A console (center console) is installed between a driver seat and a front passenger seat of a vehicle. An empty space for storing articles is formed inside of the console, and a cover configured to be pivotally opened and closed is provided on top of the console to open or close the empty space.

The cover is not only used to open or close a storage space but also generally used as an armrest for supporting a driver's arm so that, hereinafter, the cover provided on top of the console will be referred to as an armrest.

A conventional console armrest includes a sliding type in which an armrest is slidably moved forward and backward, and a tilting type in which an armrest is angularly adjusted (tilted) about a pivot axis provided at a rear end of a console.

In the case of the sliding type console armrest, however, a height cannot be adjusted and thus there is a problem in that an appropriate support height corresponding to passenger's physical condition cannot be provided, and in the case of the tilting type console armrest, a height can be adjusted by tilting, but since an armrest is inclined by the tilting, there is a problem in that an arm cannot be entirely comfortably supported.

PRIOR ART DOCUMENTS

Patent Documents (Patent Document 1) Korean Registered Patent No. 10-0748752 (Aug. 6, 2007)

(Patent Document 2) Korean Patent Laid-Open Publication No. 10-2006-0006458 (Jan. 19, 2006)

SUMMARY OF THE INVENTION

An object of the present invention is to provide a device for adjusting a height of a console in a vehicle, which appropriately adjusts a height of an armrest to be able to support an arm entirely and comfortably all the time according to passenger's physical condition by installing an upper body of a console to be vertically movable, thereby allowing the armrest to be freely adjusted in height while maintaining a horizontal state.

Other objects and advantages of the present invention can be understood by the following description and become apparent with reference to the embodiments of the present invention. Also, it is obvious to those skilled in the art to which the present invention pertains that the objects and advantages of the present invention can be realized by the means as claimed and combinations thereof.

Provided herein is a device for adjusting a height of a console in a vehicle, the device including a lower body assembly configured to be installed at an inner floor of a vehicle, an upper body assembly configured to be installed to be vertically movable on top of the lower body assembly and having an armrest at an upper end portion of the upper body assembly, a linear guide configured to guide a vertical movement of the upper body assembly by being configured with a plurality of guides configured to be fixedly installed at the upper body assembly, a plurality of rails having the same number of the guides and configured to be fixedly installed at the lower body assembly and coupled to the plurality of guides, and a plurality of lead screws configured to be installed between the plurality of guides and the plurality of rails, to be screw-coupled to the plurality of guides, and vertically move the plurality of guides when rotated; and a motor for rotating the plurality of lead screws.

The upper body assembly may include an upper body configured to form an upper exterior appearance of the console, and an upper enclosure configured to be inserted and installed inside the upper body to form an article storage space, and the lower body assembly includes a lower body configured to form a lower exterior appearance of the console, and a lower enclosure configured to be inserted and installed inside the lower body.

A flange may be formed at an upper end portion of the upper enclosure and may be fixed to an inner surface of the upper body, and an upper half portion of the lower body assembly may be inserted into a space between the upper body and the upper enclosure, which is formed by the flange.

The upper enclosure may be inserted into the lower enclosure.

A plurality of recesses and protrusions may be formed to be fitted into each other at side walls of the upper enclosure and the lower enclosure, and the plurality of recesses and protrusions may be vertically formed in straight-line shapes and serve as guides when the upper enclosure is vertically moved relative to the lower enclosure.

Each of the guides may be fixedly installed at a recess of the upper enclosure, each of the rails may be coupled to each of the guides by being fixedly installed at a rail installation portion formed to protrude from the protrusion of the lower enclosure to the outside of the lower enclosure, each of the plurality of lead screws may be inserted into a circular hole formed by a screw groove of each of the plurality of guides and a lead screw accommodation recess of each of the plurality of rails, a male thread of each of the plurality of lead screws may be engaged with a female thread of the screw groove of each of the plurality of guides, each of the plurality of lead screws may be connected to the motor, and the motor may be installed at a lower surface of the lower enclosure.

The lead screw accommodation recess may receive simply a part of a flat cross section of each of the plurality of lead screws without screw-coupling with each of the plurality of lead screws.

A guide recess of a straight-line shape may be vertically formed at both side surfaces of each of the plurality of rails, and a guide bump of a straight-line shape may be vertically formed at both inner side surfaces of each of the plurality of guides, so that the guide bump may be inserted into the guide recess.

The plurality of guides may be integrally formed on a side surface of a base plate installed at a lower surface of the upper enclosure.

A rail accommodation recess may be formed at the flange of the upper enclosure to accommodate an upper end of each of the plurality of rails.

A rail installation portion accommodation recess into which a rail installation portion of the lower enclosure is inserted may be formed on an upper surface of the lower body.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The present invention may be modified into various forms and may have a variety of embodiments, and, therefore, specific embodiments will be illustrated in the drawings and described in detail. The embodiments, however, are not to be taken in a sense which limits the present invention to the specific embodiments, and should be construed to include modifications, equivalents, or substitutes within the spirit and technical scope of the present invention. For clarity and convenience of description, thickness of lines and sizes of components shown in the accompanying drawings may be exaggerated.

Further, all terms used hereinafter are defined by considering functions in the present invention, and meanings thereof may be different according to a user, the intent of an operator, or custom. Therefore, definitions of these terms should follow contexts disclosed herein.

Hereinafter, preferred embodiments of the present invention will be described in detail with reference to the accompanying drawings.

Figure 1:
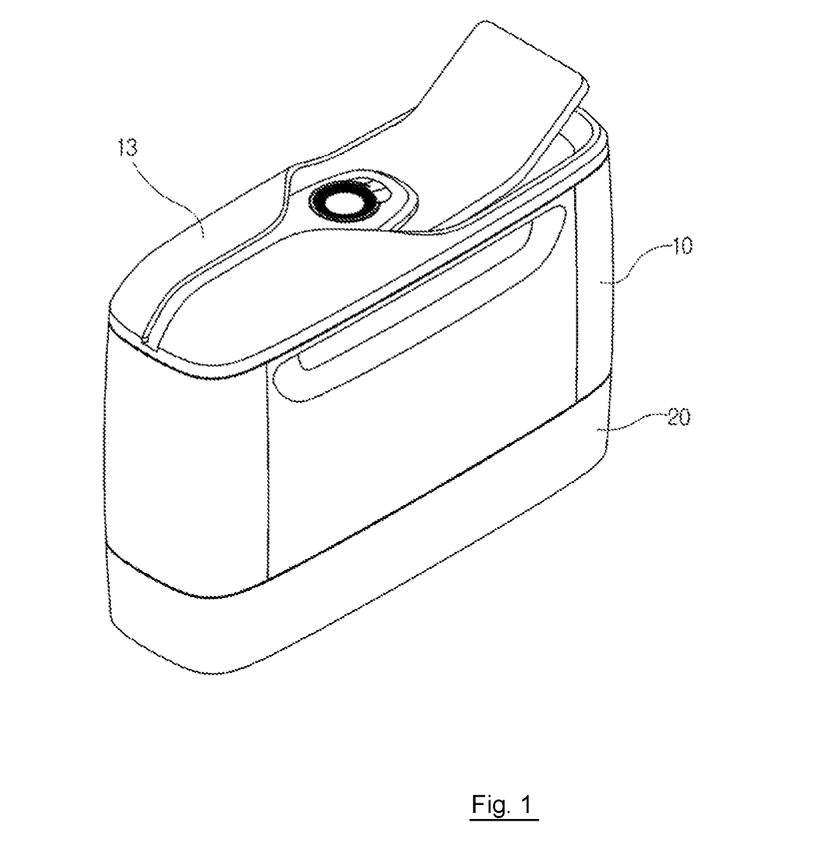
FIG. 1 is a perspective view of a console in a vehicle to which the present invention is applied.
Figure 2:
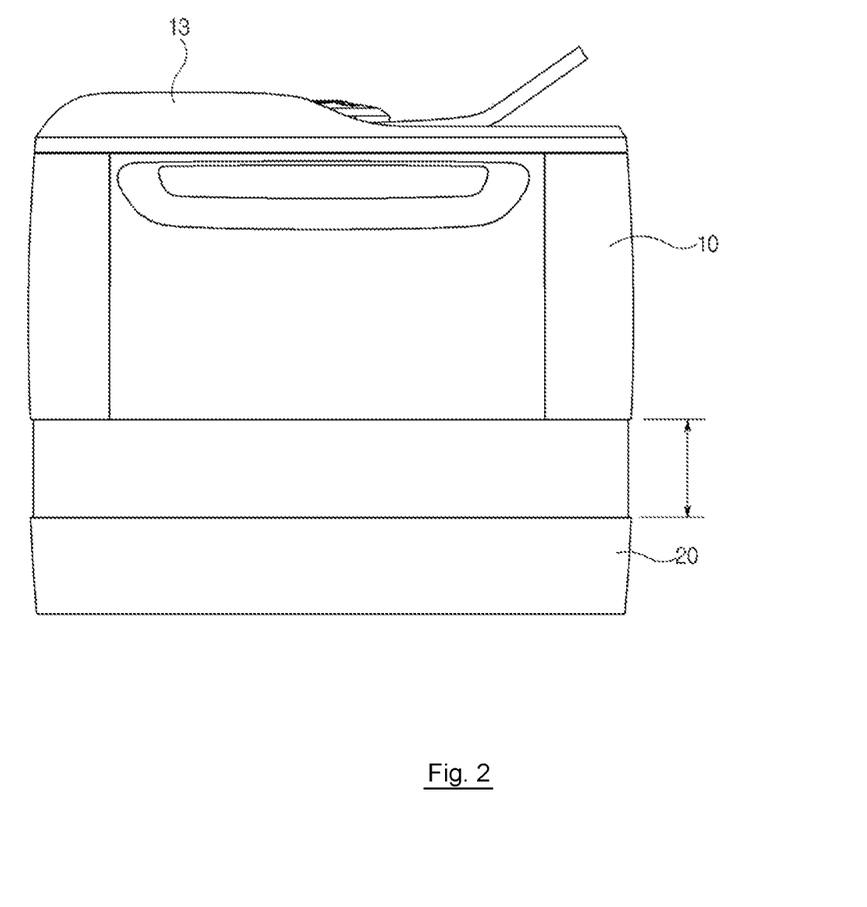
FIG. 2 is a side view of the console.

FIG. 1 is a perspective view of a console in a vehicle to which the present invention is applied, and FIG. 2 is a side view of the console.

The console according to the present invention is largely divided into an upper body assembly 10 and a lower body assembly 20. The upper body assembly 10 may installed on top of the lower body assembly 20 and may be vertically moved relative to the lower body assembly 20 while maintaining a horizontal state.

A linear guide (that is an LM guide, but for convenience, it is referred to as the linear guide in spite of a linear motion guide) may be provided between the upper body assembly 10 and the lower body assembly 20 to vertically move the upper body assembly 10 relative to the lower body assembly 20. The linear guide is configured with a guide 31, a rail 40, and a lead screw 41, and a detailed installation structure thereof will be described in detail below.

An armrest 13 capable of supporting a passenger's arm is provided on top of the upper body assembly 10. The armrest 13 opens or closes a storage space formed inside the upper body assembly 10 while being operated in a pivot or sliding manner.

The lower body assembly 20 is installed at an inner floor of the vehicle.

Figure 3:
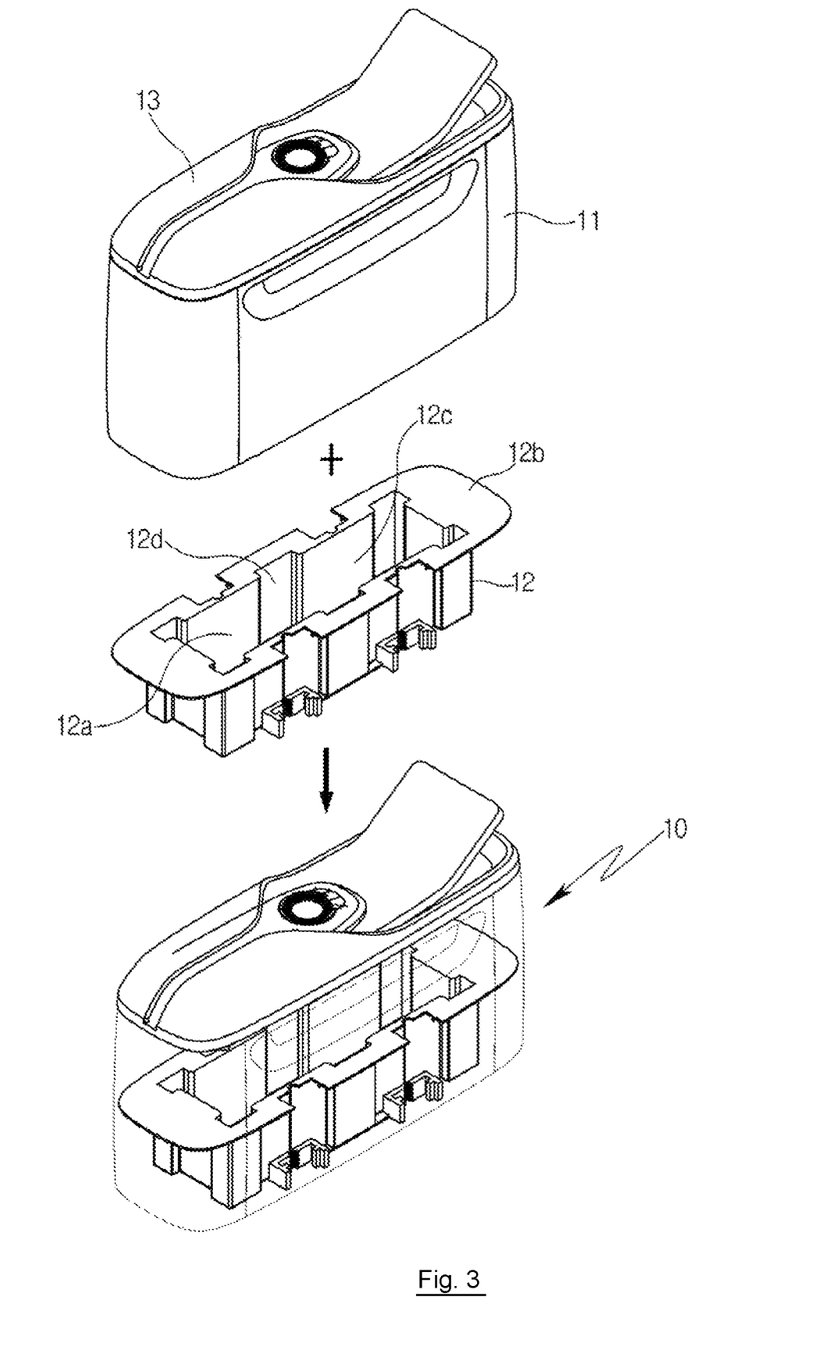
FIG. 3 is an exploded view and an assembly view of an upper body assembly of the console in the vehicle to which the present invention is applied.
Figure 5:
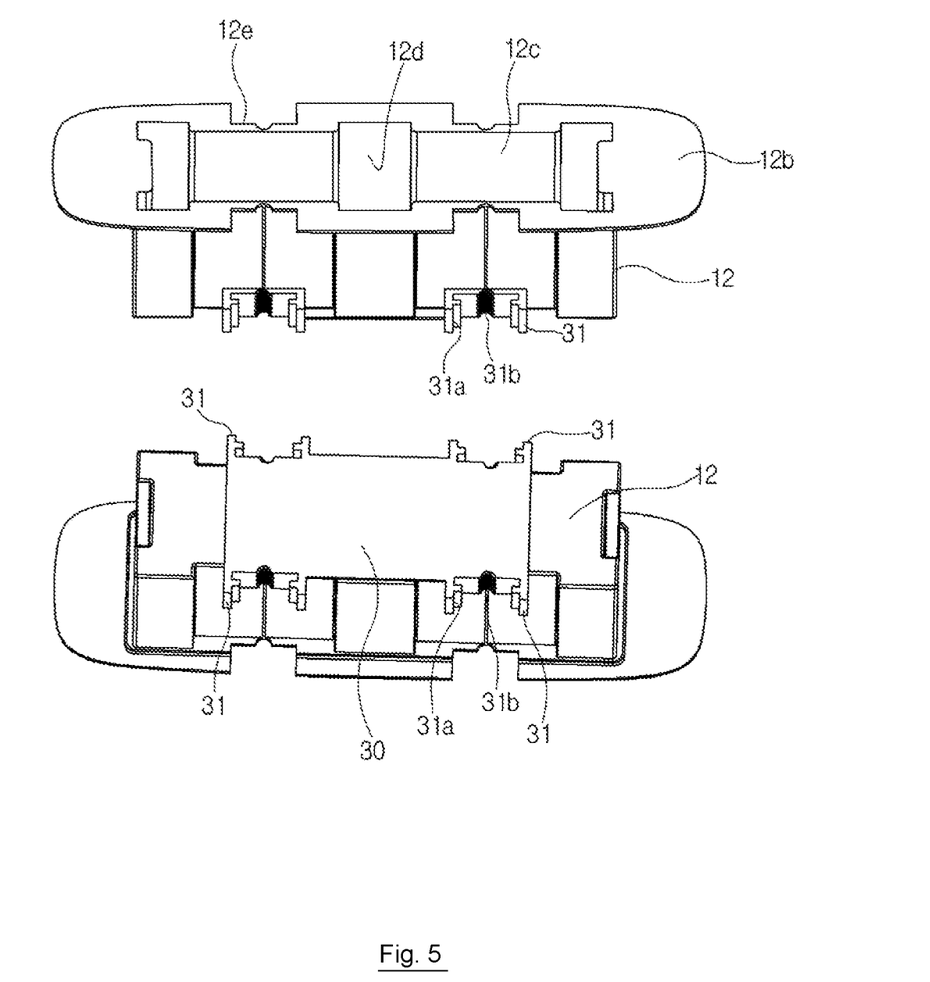
FIG. 5 is a top perspective view and a bottom perspective view of an upper enclosure which is one configuration of the upper body assembly.

As shown in FIGS. 3 and 5, the upper body assembly 10 includes an upper body 11 constituting an upper exterior appearance of the console and an upper enclosure 12 installed inside the upper body 11, and the armrest 13 is installed on top of the upper body 11.

The upper enclosure 12 is a rectangular box-shaped part, in which a space portion 12a capable of receiving articles is formed, and has an opened upper opening, and a flange 12b is formed at an upper edge of the upper enclosure 12.

The flange 12b is fixed to an inner surface of the upper body 11, an empty space corresponding to a width of the flange 12b is formed between the upper enclosure 12 and the inner surface of the upper body 11, and an upper half portion of the lower body assembly 20 is inserted into the empty space.

A plurality of recesses 12c and a plurality of protrusions 12d are formed at a side wall of the upper enclosure 12. Each of the plurality of recesses 12c protrudes to an inner side of the upper enclosure 12 to form a concave recess at an outer surface of the upper enclosure 12, and each of the plurality of protrusions 12d is formed to protrude toward the outside of the upper enclosure 12. Each of the plurality of recesses 12c and the plurality of protrusions 12d is vertically formed in a straight-line shape.

A guide 31 having a flat cross section of a "[" shape is installed below each of the plurality of recesses 12c of the upper enclosure 12. The guide 31 is fixed to the upper enclosure 12, and an opening of the flat cross section shape is installed to face an outer direction of the upper enclosure 12.

Guide bumps 31a, each of which has a straight-line shape in a vertical direction, are formed at both inner surfaces of the guide 31 to protrude in directions facing each other.

Further, a screw groove 31b having a semicircular flat cross section in the vertical direction is formed at a center portion between the inner surfaces of the guide 31.

The guides 31 installed at the plurality of recesses 12c may be formed as a single body. That is, as shown in FIG. 5, a base plate 30 may be installed at a bottom surface of the upper enclosure 12, and the guides 31 may be integrally formed at a side surface of the base plate 30.

As described above, when the guides 31 are integrally formed, even though an operation failure occurs at one guide among the guides 31 due to a failure of a motor 50 which will be described below, all the guides 31 connected to the base plate 30 are integrally vertically moved by the remaining guides which operate normally by other motors 50, so that a vertical movement of the upper enclosure 12 may be performed normally.

Further, a rail accommodation recess 12e is formed at a position corresponding to an upper portion of each of the guides 31 in the flange 12b of the upper enclosure 12, and an upper end portion of the rail 40, which will be described below, is inserted into the rail accommodation recess 12e. This is to prevent interference between the rail 40 and the flange 12b of the upper enclosure 12 when the upper enclosure 12 is fully inserted into a lower enclosure 22 (a maximum descending position of the upper enclosure 12).

Figure 4:
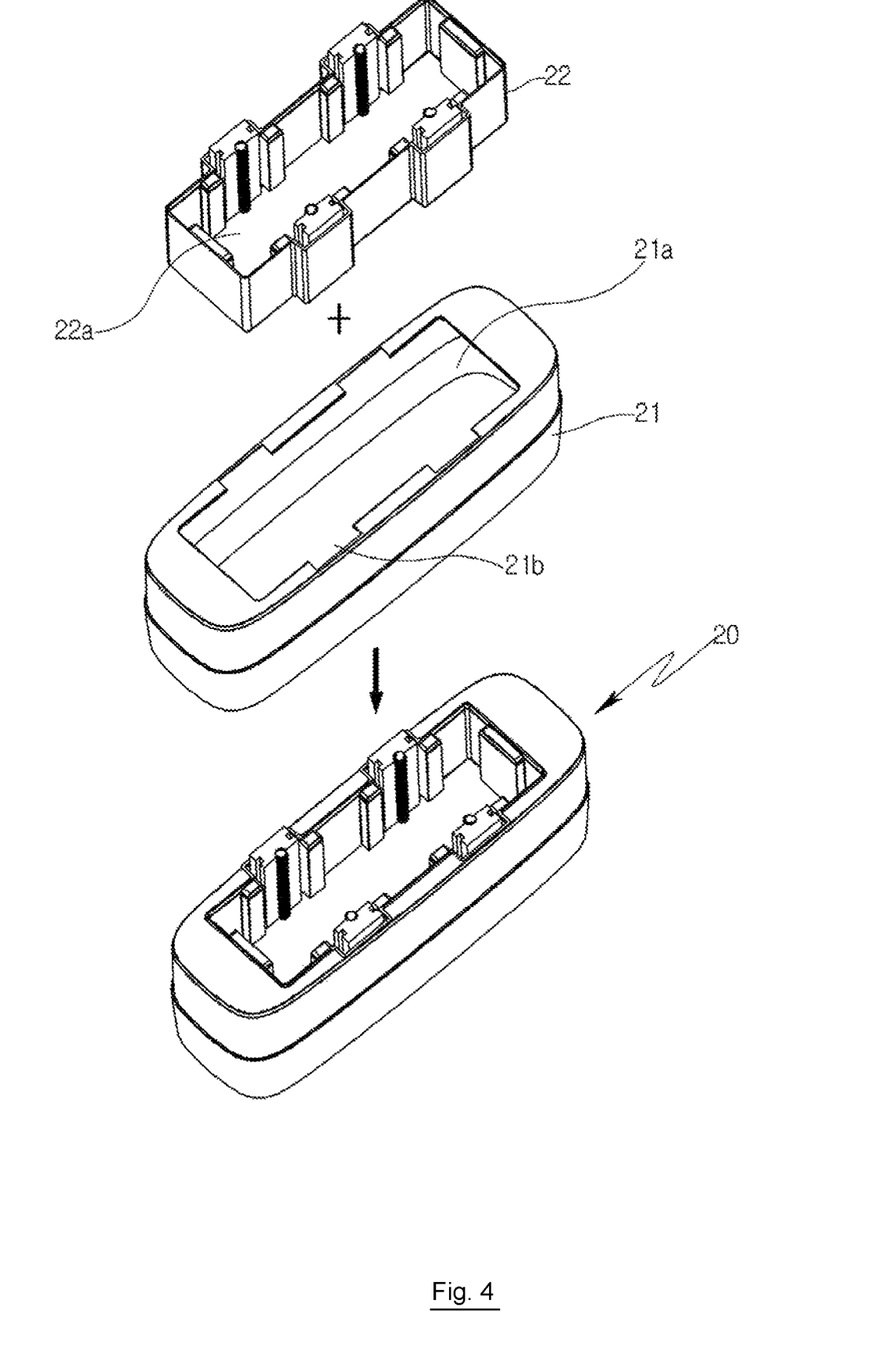
FIG. 4 is an exploded view and an assembly view of a lower body assembly of the console in the vehicle to which the present invention is applied.

As shown in FIG. 4, the lower body assembly 20 includes a lower body 21 constituting a lower exterior appearance of the console, and the lower enclosure 22 installed inside the lower body 21.

The lower body 21 may be formed to have a flat cross section of a circumferential shape identical to that of the upper body 11, and a dimension of the lower body 21 may be slightly smaller than that of the upper body 11 to be insertable into a lower portion of the upper body 11.

A rectangular-shaped space portion 21a is formed inside the lower body 21, and the lower enclosure 22 is inserted and fixed into the space portion 21a.

Figure 6:
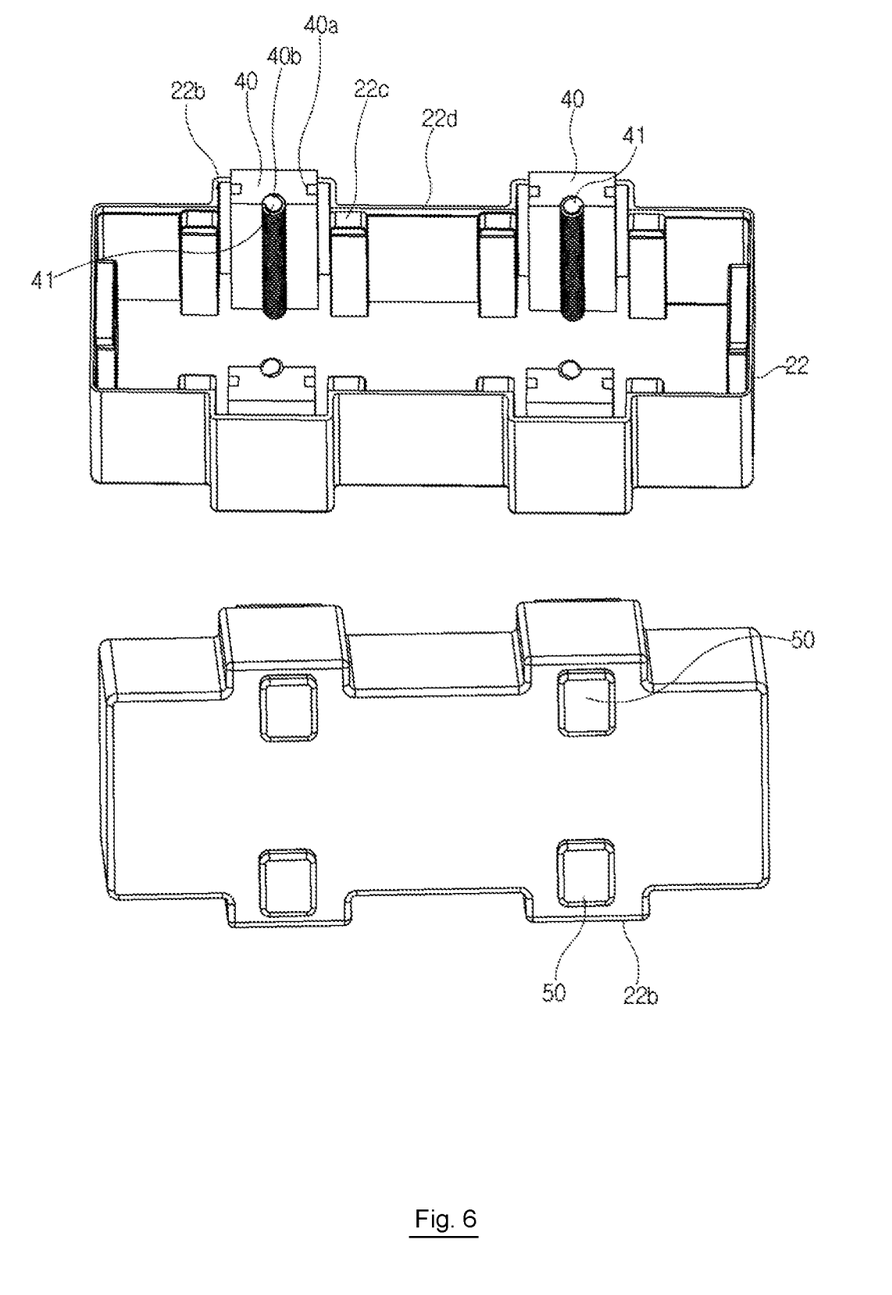
FIG. 6 is a top perspective view and a bottom perspective view of a lower enclosure which is one configuration of the lower body assembly.

As shown in FIGS. 4 and 6, a space portion 22a is formed inside the lower enclosure 22 (see FIG. 4), an upper portion of the space portion 22a has an opened rectangular-box shape, and a plurality of protrusions 22c and recesses 22d are formed at a side wall of the lower enclosure 22.

Each of the plurality of protrusions 22c is formed to protrude an inner side of the lower enclosure 22, and the plurality of recesses 22d are formed to be relatively concave between the plurality of protrusions 22c. Each of the plurality of protrusions 22c and recesses 22d is vertically formed in a straight-line shape.

A rail installation portion 22b at which the rail 40 is installed is formed at each of the plurality of protrusions 22c of the lower enclosure 22. The rail installation portion 22b has an opening toward an interior of the lower enclosure 22 and a portion opposite the opening protrudes to the outside of the lower enclosure 22.

The rail installation portion 22b is formed to have a size for which each of the guides 31 coupled to the rail 40 is accommodatable.

The rail 40 of a straight-line shape is vertically installed on an inner wall surface of the rail installation portion 22b. The rail 40 is fixed to the inner wall surface of the rail installation portion 22b, and a guide recess 40a into which the guide bump 31a of the guide 31 is inserted is formed at both side surfaces of the rail 40.

Further, a rectangular rail installation portion accommodation recess 21b having an area identical to a flat cross section of the rail installation portion 22b is formed at a position corresponding to the rail installation portion 22b on an upper surface of the lower body 21 so as to prevent interference between the rail installation portion 22b and the upper surface of the lower body 21 when the lower enclosure 22 is inserted into the space portion 21a of the lower body 21 (see FIG. 4).

Therefore, when the lower enclosure 22 is assembled into the lower body 21, the rail installation portion 22b is inserted through the rail installation portion accommodation recess 21b.

Further, a lead screw accommodation recess 40b having a semicircular flat cross section is vertically formed at a center portion between inner surfaces (surfaces toward an inner space of the lower enclosure 22) of the rail 40 in a straight-line shape. The lead screw accommodation recess 40b accommodates only a half portion of the cross section of the lead screw 41, and a female thread engaged with a male thread of the lead screw 41 is not formed at the lead screw accommodation recess 40b.

The lead screw 41 is configured such that a male thread is formed on an outer circumferential surface of a circular rod, and the lead screw 41 is connected to each of the motors 50 installed at a lower surface (an outer surface of a bottom) of the lower enclosure 22 by passing through the bottom of the lower enclosure 22. Although not shown in the drawings, a gear box may be installed between an output shaft of each of the motors 50 and the lead screw 41 to obtain an appropriate number of revolutions as well as to connect the output shaft to the lead screw 41.

Further, an operation switch (not shown) for operating the motors 50 is installed at an appropriate position of the upper body 11 so as to allow a passenger to easily operate the operation switch. The operation switch may drive the motors 50 in a forward direction or a reverse direction according to a manipulation direction of the operation switch.

Figure 7:
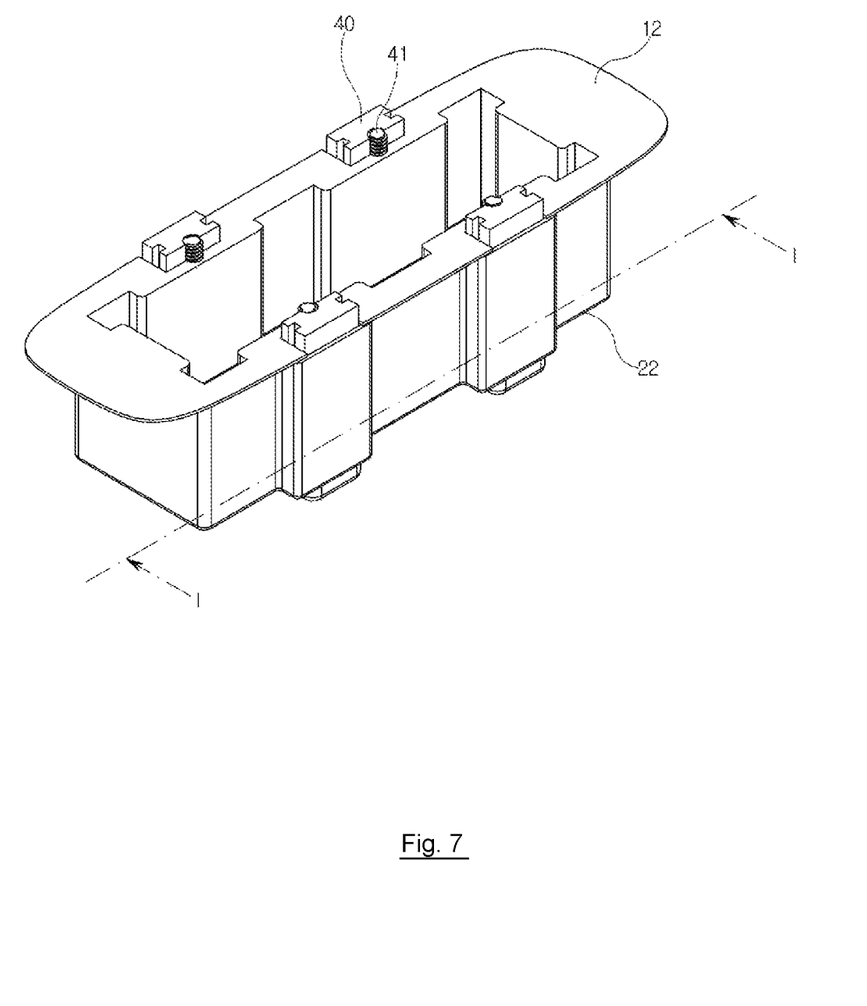
FIG. 7 is a perspective view illustrating a state in which the upper enclosure and the lower enclosure are assembled.

When the upper body assembly 10 and the lower body assembly 20, which have the above-described structure, are assembled as shown in FIG. 1, the upper enclosure 12 is inserted into the lower enclosure 22 as shown in FIG. 7.

Figure 8:
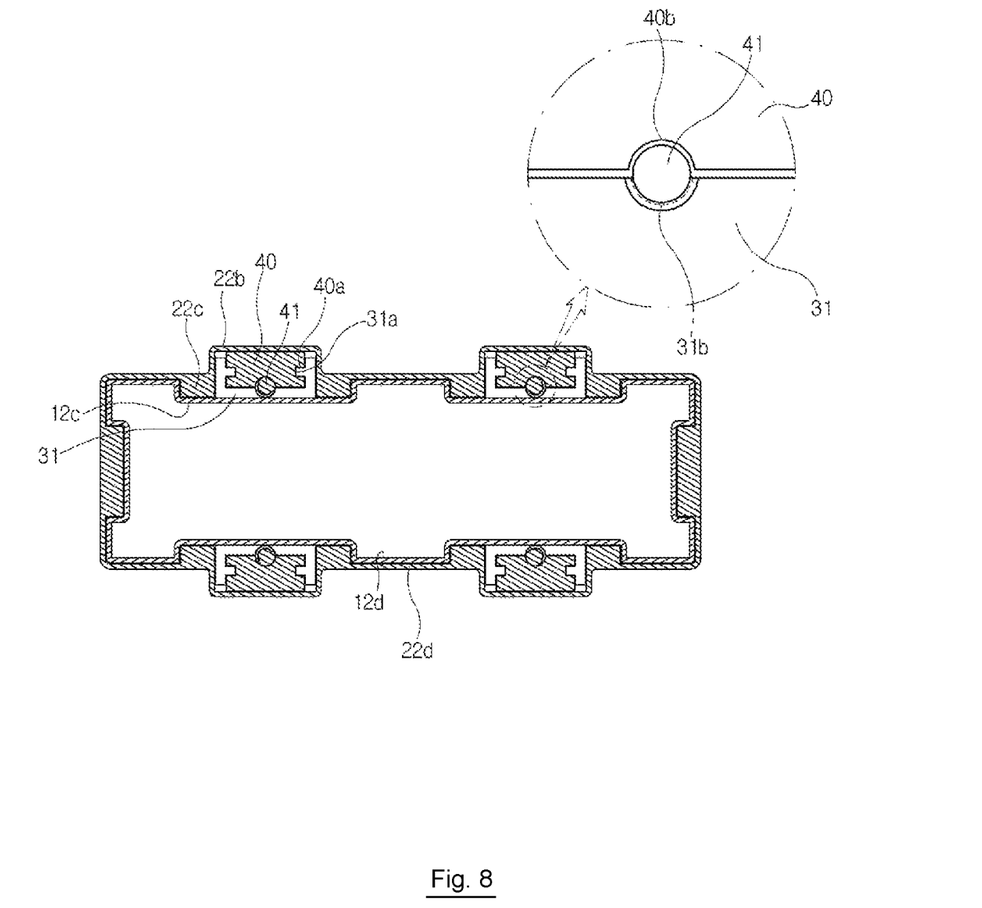
FIG. 8 is a cross-sectional view taken along the line I-I of FIG. 7 and is a plan cross-sectional view illustrating the state in which the upper enclosure and the lower enclosure are assembled.

Since the recess 12c and the protrusion 12d of the upper enclosure 12 are respectively formed at positions corresponding to the protrusion 22c and the recess 22d of the lower enclosure 22, when assembled as shown in FIG. 8, the protrusion 22c of the lower enclosure 22 is inserted into the recess 12c of the upper enclosure 12, and the protrusion 12d of the upper enclosure 12 is inserted into the recess 22d of the lower enclosure 22.

Since the recesses 12c and 22d and the protrusions 12d and 22c are vertically formed in the straight-line shapes, the recesses 12c and 22d and the protrusions 12d and 22c serve as guides for guiding a movement direction when the upper enclosure 12 is ascended or descended relative to the lower enclosure 22.

Further, as described above, when the upper enclosure 12 and the lower enclosure 22 are assembled, the guide 31 of the upper enclosure 12 is assembled with the rail 40 of the lower enclosure 22.

The rail 40 is inserted into the corresponding guide 31, and at this point, the guide bump 31a of the guide 31 is inserted into the guide recess 40a of the rail 40. The guide bump 31a and the guide recess 40a are coupled to each other, so that the guide 31 and the rail 40 are not separated from each other in a lateral direction, and a vertical linear movement of the guide 31 is accurately guided relative to the rail 40 of which a position is fixed.

In a state in which the guide 31 and the rail 40 are assembled, the lead screw 41 is inserted into a circular hole formed by a screw groove 31b of the guide 31 and a lead screw accommodation recess 40b of the rail 40. At this point, the male thread of the lead screw 41 is screw-coupled to a female thread of the screw groove 31b of the guide 31, and since a female thread is not formed at the lead screw accommodation recess 40b of the rail 40, the lead screw 41 is not screw-coupled to the lead screw accommodation recess 40b. That is, there is no coupling relationship between the lead screw 41 and the rail 40.

An operation and an operation effect of the present invention will be described below.

When a passenger operates the operation switch in one direction, the motor 50 is operated to rotate the lead screw 41 interlocked with the output shaft of the motor 50.

Figure 9:
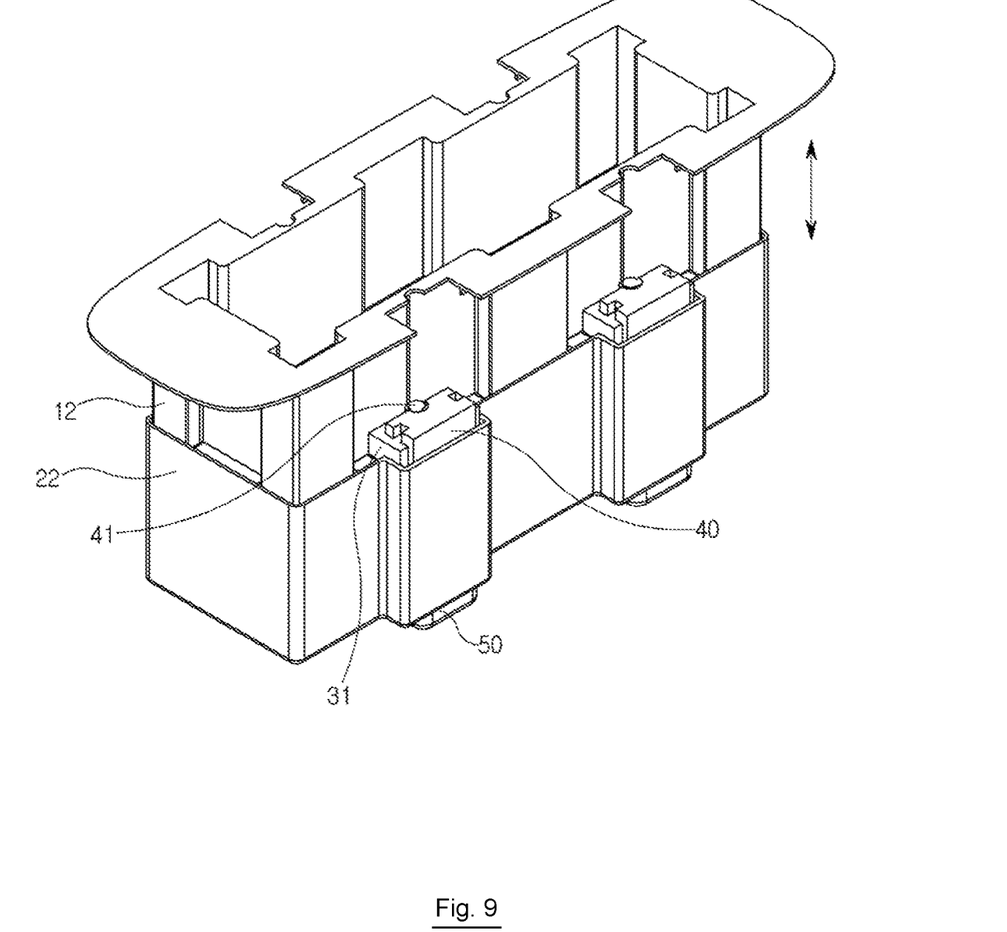
FIG. 9 is diagram illustrating the state in which the upper enclosure and the lower enclosure are assembled and illustrating a state in which the upper enclosure is ascended.

When the lead screw 41 is rotated, the guide 31 screw-coupled to the lead screw 41 is ascended and the upper enclosure 12 provided with the guide 31 is ascended together (see FIG. 9). Since the upper enclosure 12 is fixed to the upper body 11, the upper enclosure 12 and the upper body 11, i.e., the upper body assembly 10 is entirely ascended (see FIG. 10).

Figure 10:
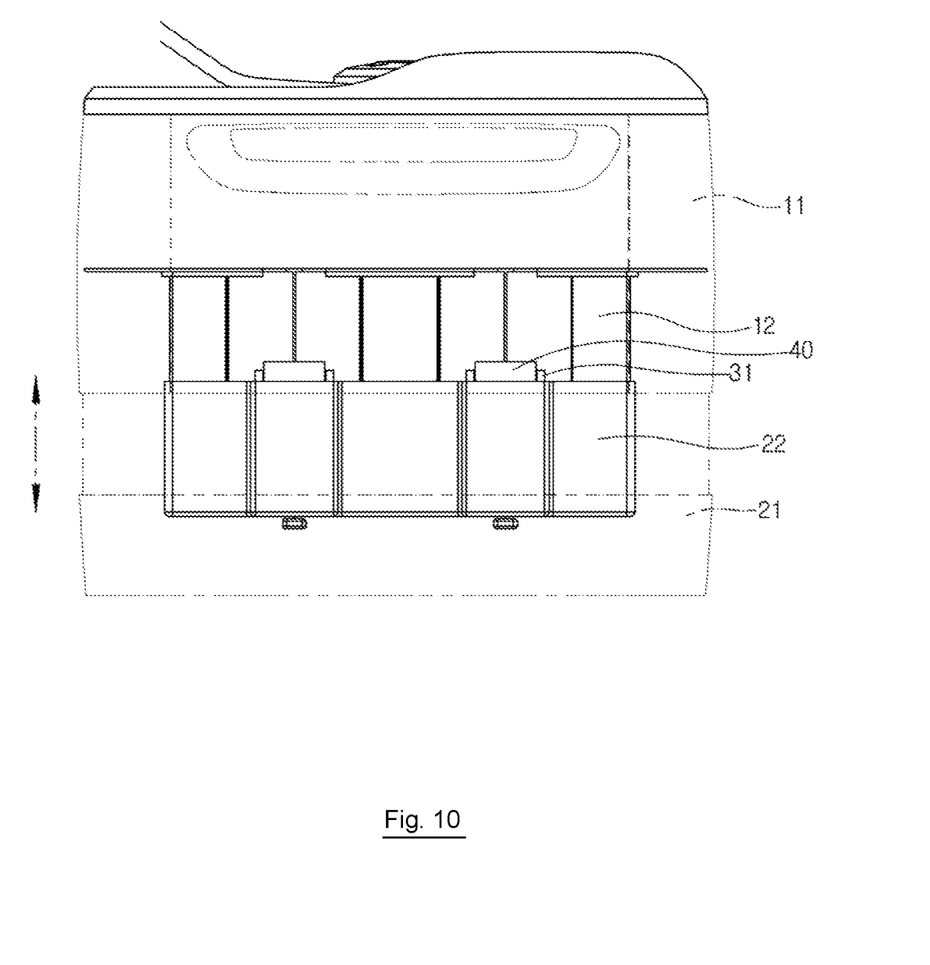
FIG. 10 is a side view of the console in the vehicle to which the present invention is applied and illustrates a schematic internal structure and the state in which the upper body assembly is ascended.

Therefore, the armrest 13 installed on top of the upper body assembly 10 is simultaneously ascended.

Meanwhile, when the passenger operates the operation switch in an opposite direction, the motor 50 is rotated in an opposite direction, and thus the lead screw 41 is also rotated in the opposite direction.

Accordingly, the guide 31 is descended along the rail 40 and the upper enclosure 12 to which the guide 31 is fixed is descended, so that the upper body assembly 10 is entirely descended together with the upper enclosure 12.

As described above, an ascending or descending position of the upper body assembly 10, i.e., a height thereof relative to the lower body assembly 20 is adjusted according to an operation direction of the operating switch by the passenger, and thus the passenger freely adjusts the height of the armrest 13 according to his or her physical condition, so that a passenger's arm can comfortably be supported.

Further, when the upper body assembly 10 is ascended or descended as described above, in addition to a guiding operation of the rail 40 and the guide 31, the upper body assembly 10 is vertically ascended and descended exactly by guiding operations of the recesses 12c and 22d and the protrusions 12d and 22c of the upper enclosure 12 and the lower enclosure 22, so that the armrest 13 provided on top of the upper body assembly 10 is ascended or descended while maintaining an accurate horizontal state.

Therefore, the passenger's arm can be more comfortably and stably supported by the armrest 13 maintaining a flat state without being inclined.

Meanwhile, when the plurality of guides 31 are integrally connected by the base plate 30, even though a failure occurs in one of the plurality of motors 50, all the guides 31 are ascended or descended by operation forces of the remaining motors 50, so that a height adjustment operation of the armrest 13 can be performed without any problem.

In accordance with the present invention as described above, a height of an armrest can be adjusted, and thus the height is adjusted according to a passenger's physical condition, so that there is an effect in that an arm can be comfortably supported at all times.

Further, since the height of the armrest is adjusted while the armrest always maintains a horizontal state, there is an effect in that the arm can be entirely stably supported.

Furthermore, the height of the armrest is adjusted by operations of a motor and a linear guide, and the motor operates according to manipulation of an operation switch by a passenger, so that there is an effect in that the height of the armrest can be adjusted very easily.

While the present invention has been described with reference to the exemplary embodiments shown in the drawings, these are merely illustrative, and those skilled in the art to which the present invention pertains will understood that various modifications and equivalent other embodiments can be implemented within the spirit and scope of the invention. Therefore, the true technical scope of the present invention should be defined by the appended claims.

What is claimed is:

1. A device of adjusting a height of a console in a vehicle, comprising:
   a lower body assembly configured to be installed at an inner floor of a vehicle;
   an upper body assembly configured to be installed to be vertically movable on top of the lower body assembly and having an armrest at an upper end portion of the upper body assembly;
   a linear guide configured to guide a vertical movement of the upper body assembly by being configured with a plurality of guides configured to be fixedly installed at the upper body assembly, a plurality of rails having the same number of the guides and configured to be fixedly installed at the lower body assembly and coupled to the plurality of guides, and a plurality of lead screws configured to be installed between the plurality of guides and the plurality of rails, to be screw-coupled to the plurality of guides, and vertically move the plurality of guides when rotated; and
   a motor for rotating the plurality of lead screws.

2. The device of claim 1, wherein the upper body assembly includes an upper body configured to form an upper exterior appearance of the console, and an upper enclosure configured to be inserted and installed inside the upper body to form an article storage space, and the lower body assembly includes a lower body configured to form a lower exterior appearance of the console, and a lower enclosure configured to be inserted and installed inside the lower body.

3. The device of claim 2, wherein a flange is formed at an upper end portion of the upper enclosure and is fixed to an inner surface of the upper body, and an upper half portion of the lower body assembly is inserted into a space between the upper body and the upper enclosure, which is formed by the flange.

4. The device of claim 3, wherein the upper enclosure is inserted into the lower enclosure.

5. The device of claim 4, wherein a plurality of recesses and protrusions are formed to be fitted into each other at side walls of the upper enclosure and the lower enclosure, and the plurality of recesses and protrusions are vertically formed in straight-line shapes and serve as guides when the upper enclosure is vertically moved relative to the lower enclosure.

6. The device of claim 5, wherein each of the guides is fixedly installed at a recess of the upper enclosure, each of the rails is coupled to each of the guides by being fixedly installed at a rail installation portion formed to protrude from the protrusion of the lower enclosure to the outside of the lower enclosure, each of the plurality of lead screws is inserted into a circular hole formed by a screw groove of each of the plurality of guides and a lead screw accommodation recess of each of the plurality of rails, a male thread of each of the plurality of lead screws is engaged with a female thread of the screw groove of each of the plurality of guides, each of the plurality of lead screws is connected to the motor, and the motor is installed at a lower surface of the lower enclosure.

7. The device of claim 6, wherein the lead screw accommodation recess receives a part of a flat cross section of each of the plurality of lead screws without screw-coupling with each of the plurality of lead screws.

8. The device of claim 6, wherein a guide recess of a straight-line shape is vertically formed at both side surfaces of each of the plurality of rails, and a guide bump of a straight-line shape is vertically formed at both inner side surfaces of each of the plurality of guides, so that the guide bump is inserted into the guide recess.

9. The device of claim 6, wherein the plurality of guides are integrally formed on a side surface of a base plate installed at a lower surface of the upper enclosure.

10. The device of claim 6, wherein a rail accommodation recess is formed at the flange of the upper enclosure to accommodate an upper end of each of the plurality of rails.

11. The device of claim 6, wherein a rail installation portion accommodation recess into which a rail installation portion of the lower enclosure is inserted is formed on an upper surface of the lower body.

* * * * *